(12) United States Patent
Hong

(10) Patent No.: US 12,535,882 B2
(45) Date of Patent: Jan. 27, 2026

(54) ELECTRONIC DEVICE AND METHOD FOR ACQUIRING USER'S GAZE INFORMATION

(71) Applicant: Samsung Electronics Co., Ltd., Suwon-si (KR)

(72) Inventor: Sungbin Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 331 days.

(21) Appl. No.: 18/168,193

(22) Filed: Feb. 13, 2023

(65) Prior Publication Data

US 2023/0195225 A1 Jun. 22, 2023

Related U.S. Application Data

(63) Continuation of application No. PCT/KR2021/011043, filed on Aug. 19, 2021.

(30) Foreign Application Priority Data

Sep. 3, 2020 (KR) .......................... 10-2020-0112513

(51) Int. Cl.
*G06F 3/01* (2006.01)
*G06V 40/18* (2022.01)

(52) U.S. Cl.
CPC .............. *G06F 3/013* (2013.01); *G06V 40/18* (2022.01)

(58) Field of Classification Search
CPC ................................ G06F 3/013; G06V 40/18
USPC ........................................................ 715/700
See application file for complete search history.

(56) References Cited

U.S. PATENT DOCUMENTS

| | | | |
|---|---|---|---|
| 9,996,151 B2 * | 6/2018 | Iwasaki | G06F 3/0325 |
| 10,319,266 B1 * | 6/2019 | Percival | G02B 27/0172 |
| 10,401,956 B2 * | 9/2019 | Price | G01J 1/044 |
| 10,401,969 B2 | 9/2019 | Yoon et al. | |
| 10,422,995 B2 * | 9/2019 | Haddick | G06F 3/013 |
| 10,629,105 B2 | 4/2020 | Perreault et al. | |
| 10,788,894 B2 * | 9/2020 | Price | G06V 40/19 |
| 10,838,210 B2 * | 11/2020 | Robaina | G06F 3/017 |

(Continued)

FOREIGN PATENT DOCUMENTS

| | | |
|---|---|---|
| CN | 109143581 A | 1/2019 |
| CN | 111580270 A | 8/2020 |

(Continued)

OTHER PUBLICATIONS

International Search Report dated Nov. 23, 2021, issued in International Patent Application No. PCT/KR2021/011043.

(Continued)

*Primary Examiner* — William D Titcomb
(74) *Attorney, Agent, or Firm* — Jefferson IP Law, LLP

(57) ABSTRACT

An electronic device is provided. The electronic device includes a plurality of pixels, light-receiving pixels disposed between the plurality of pixels, a display composed of the plurality of pixels and the light-receiving pixels, and a processor operatively coupled to the display. The processor receives light reflected from each of the user's left and right eyes through the one or more light-receiving pixels constituting the display, confirms the gaze direction of each of the left and right eyes on the basis of the light received through the one or more light-receiving pixels, and outputs an image based on the confirmed gaze direction.

16 Claims, 13 Drawing Sheets

(56) References Cited

U.S. PATENT DOCUMENTS

| | | |
|---|---|---|
| 11,089,289 B2 | 8/2021 | Ohishi et al. |
| 11,145,687 B2 | 10/2021 | Heo et al. |
| 11,226,489 B2* | 1/2022 | Haddick .................. G06F 1/163 |
| 11,327,312 B2* | 5/2022 | Robaina ................. B60K 35/80 |
| 11,333,891 B2* | 5/2022 | Bae ..................... G06F 3/04842 |
| 11,395,629 B2 | 7/2022 | Iwasaki et al. |
| 11,463,636 B2* | 10/2022 | Berkovich ........... H04N 25/771 |
| 12,229,654 B2* | 2/2025 | Biswas ................. G06N 3/044 |
| 2008/0062291 A1* | 3/2008 | Sako ................. G02B 27/0093 |
| | | 348/207.99 |
| 2012/0154920 A1* | 6/2012 | Harrison .............. G02B 27/017 |
| | | 359/619 |
| 2015/0192777 A1* | 7/2015 | Bae ................... G02B 27/0101 |
| | | 359/245 |
| 2016/0147301 A1* | 5/2016 | Iwasaki .................... G06F 3/013 |
| | | 345/157 |
| 2017/0038834 A1 | 2/2017 | Wilson et al. |
| 2018/0197624 A1* | 7/2018 | Robaina ............... A61B 5/1171 |
| 2018/0329489 A1* | 11/2018 | Price .................... G06V 10/143 |
| 2019/0011703 A1* | 1/2019 | Robaina ................. A61B 90/36 |
| 2019/0019023 A1 | 1/2019 | Konttori et al. |
| 2019/0025589 A1* | 1/2019 | Haddick ............ G02B 27/0172 |
| 2019/0041983 A1 | 2/2019 | Hicks et al. |
| 2019/0042823 A1 | 2/2019 | He et al. |
| 2019/0235677 A1 | 8/2019 | Liu et al. |
| 2019/0384388 A1* | 12/2019 | Price .................... G02B 27/0172 |
| 2020/0073128 A1* | 3/2020 | Haddick ................. G06F 1/163 |
| 2020/0150440 A1* | 5/2020 | Bae ..................... G02B 27/0172 |
| 2020/0183171 A1* | 6/2020 | Robaina ................. A61B 90/36 |
| 2021/0058562 A1* | 2/2021 | Toguchi ............... H04N 23/632 |
| 2021/0176383 A1* | 6/2021 | Kim ....................... G06F 3/013 |
| 2024/0028878 A1* | 1/2024 | Yu .......................... G06N 3/042 |
| 2024/0095077 A1* | 3/2024 | Singh .................... G06F 9/5027 |
| 2024/0096064 A1* | 3/2024 | Li .......................... G06V 10/82 |

FOREIGN PATENT DOCUMENTS

| | | |
|---|---|---|
| JP | 4040730 B2 | 1/2008 |
| KR | 10-2014-0018209 A | 2/2014 |
| KR | 10-2016-0024307 A | 3/2016 |
| KR | 10-2017-0133390 A | 12/2017 |
| KR | 10-2017-0139521 A | 12/2017 |
| KR | 10-2019-0032572 A | 3/2019 |
| KR | 10-2019-0089605 A | 7/2019 |
| KR | 10-2021-0025617 A | 3/2021 |
| KR | 10-2375562 B1 | 3/2022 |
| KR | 10-2376854 B1 | 3/2022 |

OTHER PUBLICATIONS

Extended European Search Report dated Dec. 20, 2023, issued in European Application No. 21864566.1-1020.

Indian Office Action dated Jan. 30, 2024, issued in Indian Application No. 202337010153.

Korean Office Action dated Jul. 2, 2025, issued in Korean Application No. 10-2020-0112513.

European Office Action dated Sep. 29, 2025, issued in European Application No. 21 864 566.1-1001.

* cited by examiner

ELECTRONIC DEVICE AND METHOD FOR ACQUIRING USER'S GAZE INFORMATION

CROSS-REFERENCE TO RELATED APPLICATION(S)

This application is a continuation application, claiming priority under § 365(c), of an International application No. PCT/KR2021/011043, filed on Aug. 19, 2021, which is based on and claims the benefit of a Korean patent application number 10-2020-0112513, filed on Sep. 3, 2020, in the Korean Intellectual Property Office, the disclosure of which is incorporated by reference herein in its entirety.

BACKGROUND

1. Field

The disclosure relates to an electronic device and a method of acquiring gaze information of a user.

2. Description of Related Art

An electronic device such as an augmented reality (AR) device may provide a user with an image, for example, a virtual image based on the real world. The electronic device may output an image based on the gaze information of the user, and may detect and track the movement of eyes, for example, pupils of the user wearing the electronic device by using, for example, an infrared camera. For instance, the electronic device may output an optical signal through an optical instrument such as an infrared light emitting diodes (LED). The output light may be reflected from the user's eyes. The electronic device may receive reflected light through an image sensor of the infrared camera, and detect and track eye movements based on the received light. The electronic device may output, based on the position and movement direction of the user's eyes, a virtual image corresponding to the direction in which the user's eyes move.

The above information is presented as background information only to assist with an understanding of the disclosure. No determination has been made, and no assertion is made, as to whether any of the above might be applicable as prior art with regard to the disclosure.

SUMMARY

However, since such an electronic device has to separately equipped with an infrared camera as well as an optical instrument to obtain the user's gaze information, it is not only difficult to miniaturize the electronic device, but also power consumption may be high because the optical instrument and the infrared camera must be simultaneously driven.

Aspects of the disclosure are to address at least the above-mentioned problems and/or disadvantages and to provide at least the advantages described below. Accordingly, an aspect of the disclosure is to provide an electronic device and a method of acquiring gaze information of a user.

Additional aspects will be set forth in part in the description which follows and, in part, will be apparent from the description, or may be learned by practice of the presented embodiments.

In accordance with an aspect of the disclosure, an electronic device is provided. The electronic device includes a display composed of micro LEDs. The display composed of micro LEDs may include a plurality of pixels for displaying an image and light-receiving pixels arranged between the plurality of pixels.

According to various embodiments of the disclosure, light output from the display composed of micro LEDs may be reflected from the user's eyes and received by one or more light-receiving pixels constituting the display. The electronic device may detect and track the gaze of the user based on light received through one or more light-receiving pixels.

In accordance with another aspect of the disclosure, an electronic device is provided. The electronic device includes a plurality of pixels, light-receiving pixels arranged between the plurality of pixels, a display composed of the plurality of pixels and the light-receiving pixels, and a processor operatively connected to the display, wherein the processor may be configured to receive light reflected from each of user's left and right eyes through one or more light-receiving pixels constituting the display, identify a gaze direction of each of the left and right eyes based on the light received through the one or more light-receiving pixels, and output an image based on the identified gaze direction.

In accordance with another aspect of the disclosure, a method for obtaining user's gaze information by using light-receiving pixels of a display of an electronic device is provided. The method includes receiving light reflected from each of user's left and right eyes through one or more light-receiving pixels constituting the display, identifying a gaze direction of each of the left and right eyes based on the light received through the one or more light-receiving pixels, and outputting an image based on the identified gaze direction.

According to various embodiments of the disclosure, the electronic device may obtain information on the gaze of the user by using one or more light-receiving pixels of the display composed of micro LEDs without being separately equipped with an optical instrument or an infrared camera for detecting the gaze of the user. As an optical instrument and an infrared camera for detecting a user's gaze are not separately provided, the electronic device can be miniaturized and lightweight.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
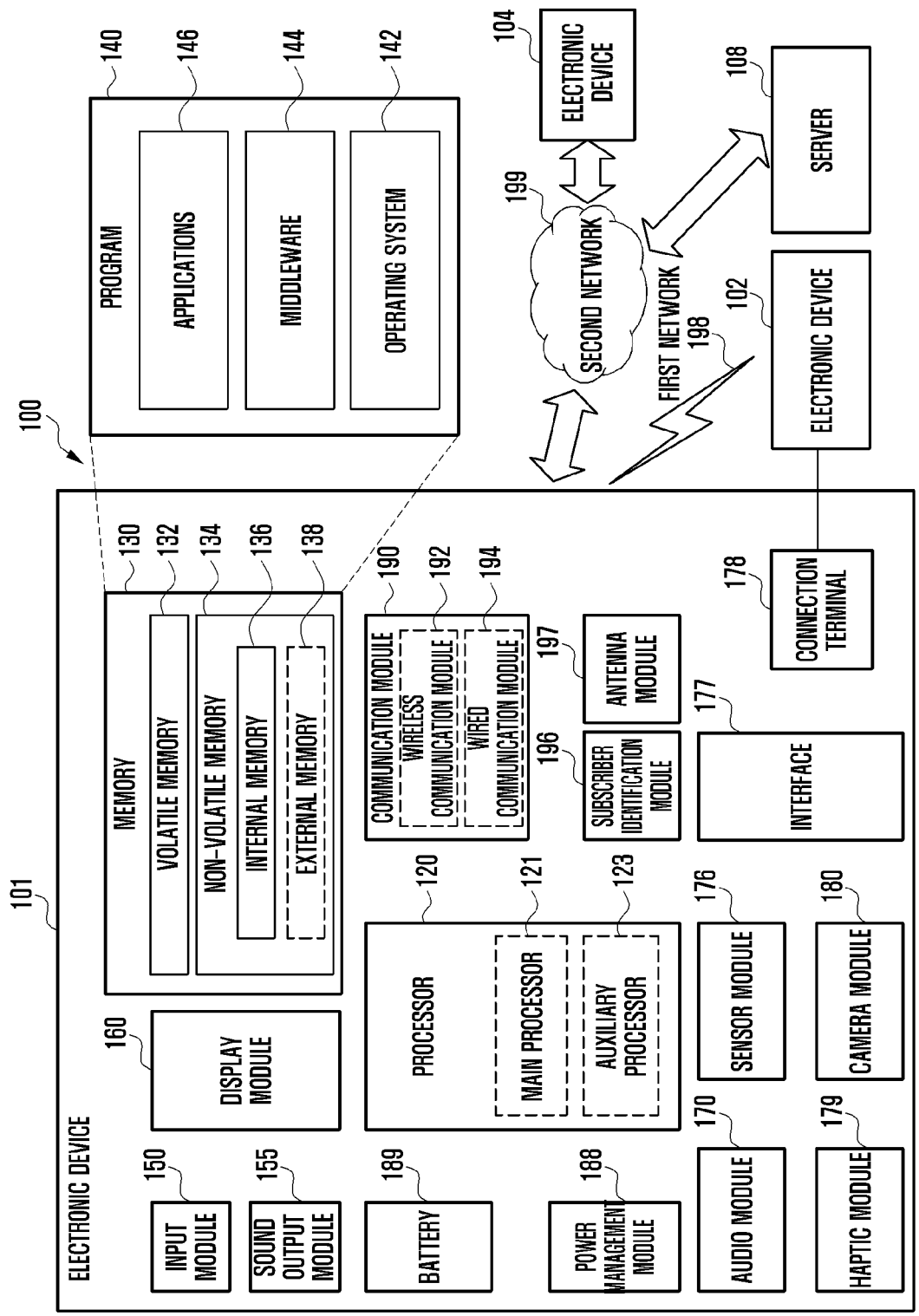
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In some embodiments, at least one of the components (e.g., the connection terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include an internal memory 136 and/or an external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., electronic device 102) (e.g., speaker or headphone) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., through wires) or wirelessly. According to an embodiment, the interface 177 may include, for example, a high-definition multimedia interface (HDMI), a universal serial bus (USB) interface, a secure digital (SD) card interface, or an audio interface.

The connection terminal 178 may include a connector via which the electronic device 101 may be physically connected with the external electronic device (e.g., the electronic device 102). According to an embodiment, the connection terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., an application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5th generation (5G) network, after a $4^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., an mmwave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices (e.g., electronic devices 102 and 104 or server 108). For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
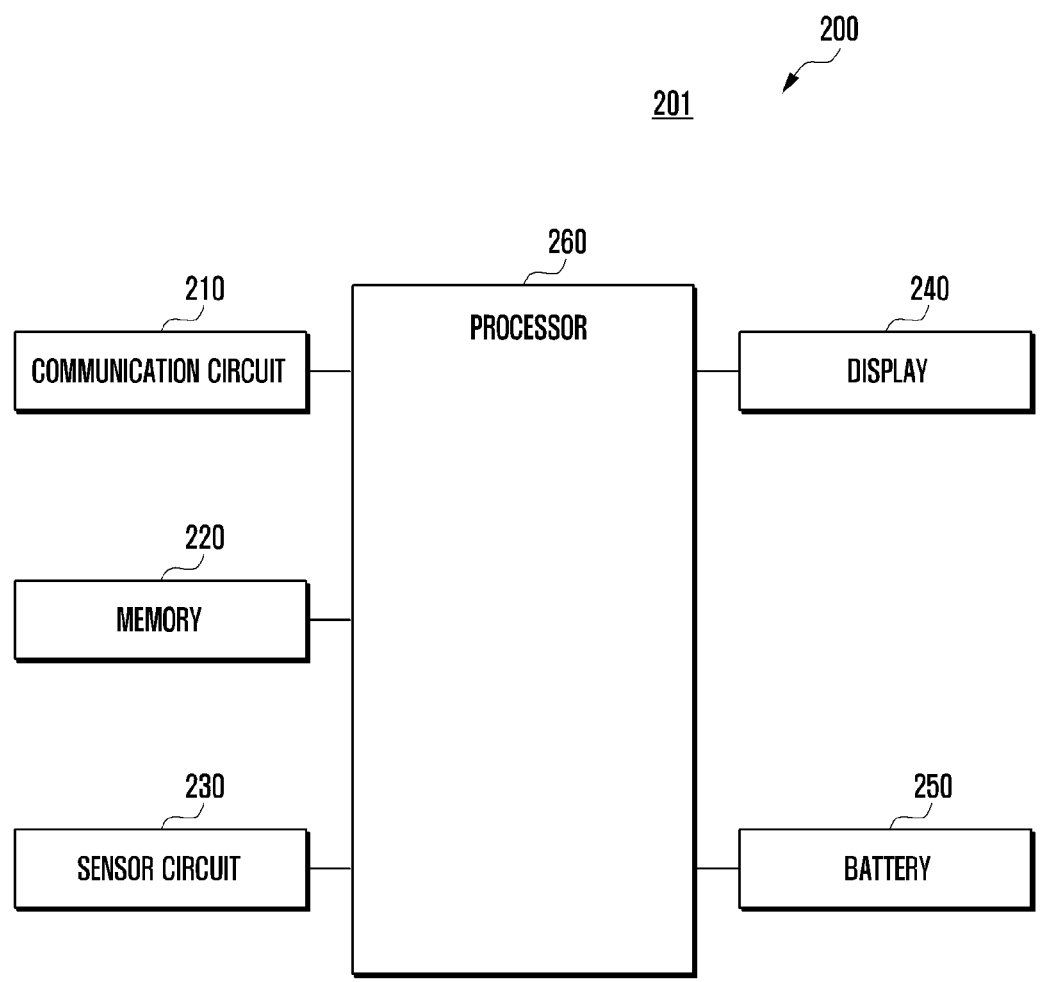
FIG. 2 is a diagram illustrating an electronic device according to an embodiment of the disclosure.

FIG. 2 is a diagram illustrating an electronic device according to embodiment of the disclosure.

Referring to FIG. 2, diagram 200 illustrates an electronic device 201 (e.g., electronic device 101 in FIG. 1) including a communication circuit 210 (e.g., communication module 190 in FIG. 1), a memory 220 (e.g., memory 130 in FIG. 1), a sensor circuit 230 (e.g., sensor module 176 in FIG. 1), a display 240 (e.g., display module 160 in FIG. 1), a battery 250 (e.g., battery 189 in FIG. 1), and a processor 260 (e.g., processor 120 in FIG. 1).

According to various embodiments of the disclosure, the communication circuit 210 (e.g., communication module 190 in FIG. 1) may establish a communication channel with an external electronic device (e.g., electronic device 102 in FIG. 1) and support transmission and reception of various data to and from the external electronic device.

According to various embodiments of the disclosure, the memory 220 (e.g., memory 130 in FIG. 1) may store a program that identifies the gaze direction of each of the user's left and right eyes based on light received through one or more light-receiving pixels constituting the display 240. The memory 220 may store a program that outputs an image based on the identified gaze directions of the user's left and right eyes. The memory 220 may store a program that adjust the periodicity of outputting a video signal and the periodicity of receiving light reflected from the user's left and right eyes.

According to various embodiments of the disclosure, the sensor circuit 230 (e.g., sensor module 176 in FIG. 1) may measure a physical quantity or sense an operating state of the electronic device 201 and convert the measured or sensed information into an electrical signal. The sensor circuit 230 may include, for example, at least one of an acceleration sensor, a geomagnetic sensor, a gyro sensor, a magnetic sensor, a proximity sensor, or a gesture sensor.

According to various embodiments of the disclosure, the display 240 (e.g., display module 160 in FIG. 1) may include at least one micro light emitting diode (LED). The display 240 may include a first display (not shown) and a second display (not shown). Each of the first display and the second display may include a plurality of pixels (e.g., red pixel, green pixel, blue pixel) for displaying a virtual image, and a light-receiving pixel disposed between the plurality of pixels to receive light reflected from the eye.

According to various embodiments of the disclosure, one or more batteries (e.g., battery 189 in FIG. 1) may be provided, and may supply power to components constituting the electronic device 201.

According to various embodiments of the disclosure, the processor 260 (e.g., processor 120 in FIG. 1) may receive light reflected from each of the user's left and right eyes through one or more light-receiving pixels constituting the display 240 (e.g., first display and second display). The processor 260 may identify the gaze directions of the user's left and right eyes based on light received through one or more light-receiving pixels. For example, the processor 260 may identify the user's gaze direction (e.g., pupil movement) based on light reflected from the user's eyes (e.g., user's left and right eyes) and output an image based on this.

According to various embodiments of the disclosure, the processor 260 may output an image on a first periodicity. The processor 260 may receive light reflected from each of the left and right eyes of the user through one or more light-receiving pixels constituting the display on a second periodicity shorter than (or longer than, or equal to) the first periodicity and identify the gaze directions of the left and right eyes based on the received light.

The electronic device 201 according to various embodiments may include a plurality of pixels, light-receiving pixels disposed between the plurality of pixels, the display 240 composed of the plurality of pixels and the light-receiving pixels, and the processor 260 operatively connected to the display 240, wherein the processor 260 may be configured to receive light reflected from each of the user's left and right eyes through one or more light-receiving pixels constituting the display 240, identify the gaze direction of each of the left and right eyes based on the light received through the one or more light-receiving pixels, and output an image based on the identified gaze direction.

According to various embodiments, the processor 260 may be configured to receive light having been output from the display 240 and reflected from each of the user's left and right eyes through the one or more light-receiving pixels, and a path through which the light is output and a path through which the light is received through the one or more light-receiving pixels may be the same.

According to various embodiments, the processor 260 may be configured to adjust the timing of driving the plurality of pixels and the timing of driving the one or more light-receiving pixels.

According to various embodiments, the processor 260 may be configured to: control outputting the image by driving the plurality of pixels on a first periodicity; and receive the light reflected from each of the user's left and right eyes by driving the one or more light-receiving pixels on a second periodicity equal to, or longer than the first periodicity.

According to various embodiments, the processor 260 may be configured to: control outputting the image by driving the plurality of pixels on a first periodicity; and receive the light reflected from each of the user's left and right eyes by driving the one or more light-receiving pixels on a second periodicity shorter than the first periodicity.

According to various embodiments, the electronic device 201 may further include at least one light source for outputting infrared light, and the processor 260 may be configured to receive infrared light having been output through the at least one light source and reflected from each of the user's left and right eyes through the one or more light-receiving pixels, wherein a path through which the infrared light is output and a path through which the infrared light is received through the one or more light-receiving pixels may be different.

According to various embodiments, each of the plurality of pixels and the one or more light-receiving pixels may include a micro lens.

According to various embodiments, the plurality of pixels and the one or more light-receiving pixels may be arranged to be separated by partition walls.

According to various embodiments, the display 240 may include signal transmission paths for controlling the plurality of pixels and signal transmission paths for controlling the one or more light-receiving pixels.

According to various embodiments, if the amount of charge of the one or more light-receiving pixels having received light reflected from each of the left and right eyes of the user is less than or equal to a specified amount of charge, the processor 260 may be configured to receive the light reflected from each of the user's left and right eyes by using the one or more light-receiving pixels and one or more light-receiving pixels arranged close to the one or more light-receiving pixels.

Figure 3:
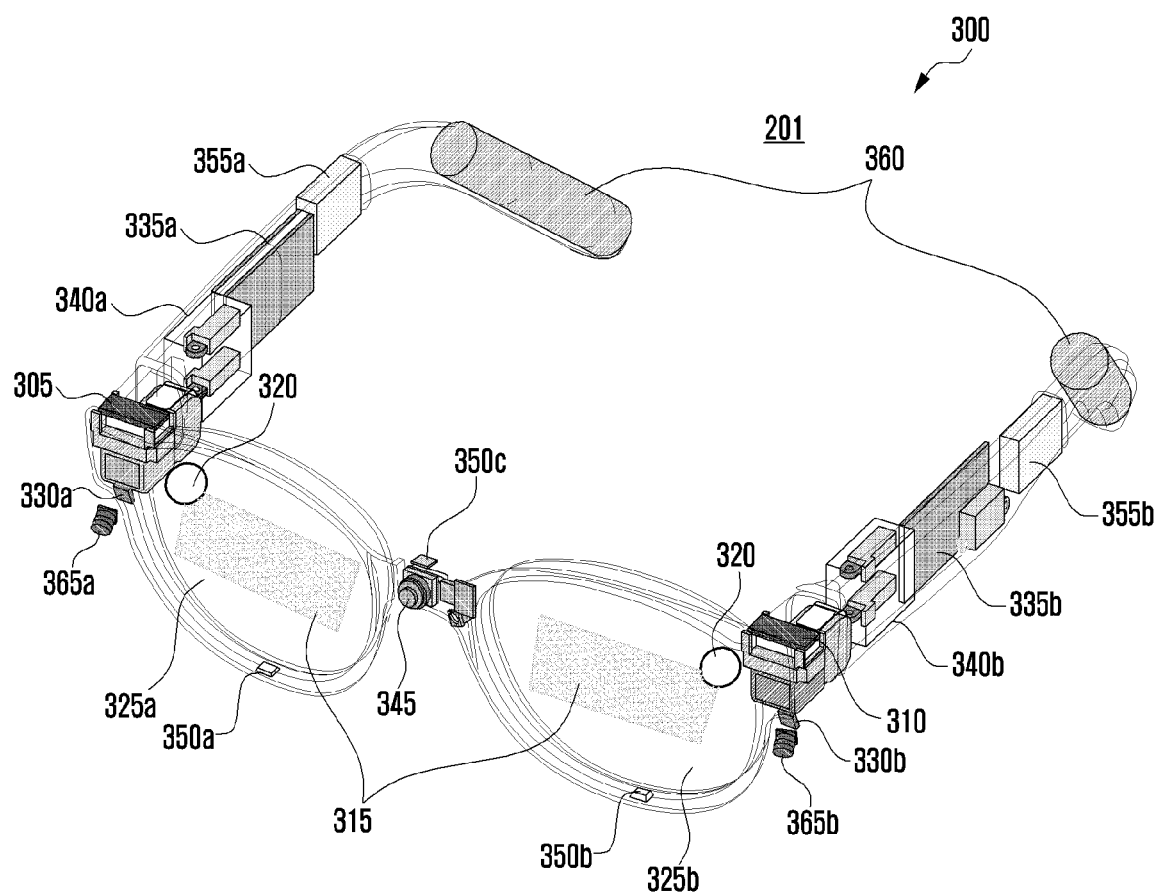
FIG. 3 is a diagram illustrating an electronic device, for example, AR glasses according to an embodiment of the disclosure.

FIG. 3 is a diagram illustrating an electronic device, for example, AR glasses according to an embodiment of the disclosure.

Referring to FIG. 3, diagram 300 illustrates an electronic device (e.g., electronic device 201 in FIG. 2) that may be worn on the user's face and provide an image related to an augmented reality service and/or a virtual reality service to the user.

In an embodiment, the electronic device 201 may include a first display 305, a second display 310, a screen display section 315, an input optical member 320, a first transparent member 325a, a second transparent member 325b, lighting units 330a and 330b, a first PCB 335a, a second PCB 335b, a first hinge 340a, a second hinge 340b, a first camera 345, a plurality of microphones (e.g., first microphone 350a, second microphone 350b, third microphone 350c), a plurality of speakers (e.g., first speaker 355a, second speaker 355b), a battery 360, a second camera 365a, and a third camera 365b.

In an embodiment, the display (e.g., first display 305, second display 310) may include, for example, liquid crystal display (LCD), digital mirror device (DMD), liquid crystal on silicon (LCoS), organic light emitting diodes (OLED), or micro light emitting diodes (micro LED). Although not shown, when the display is implemented with one of liquid crystal display, digital mirror device, and liquid crystal on silicon, the electronic device 201 may include a light source for radiating light to a screen output area of the display. In another embodiment, when the display is capable of generating light by itself, for example, when the display is implemented with either organic light emitting diodes or micro LEDs, the electronic device 201 may provide a good quality virtual image to the user even without a separate light source. In an embodiment, when the display is implemented with organic light emitting diodes or micro LEDs, as a light source is not necessary, the electronic device 201 can be lightened in weight.

The display (e.g., first display 305, second display 310) according to various embodiments of the disclosure may include at least one micro light emitting diode (LED). For example, a micro LED can express red (R), green (G), and blue (B) by self-emission; as the size is small (e.g., about 100 μm or less), one chip can implement one pixel (e.g., one of R, G and B). Hence, when the display is composed of micro LEDs, high resolution can be provided without a backlight unit (BLU).

It is not limited thereto, and one pixel may include R, G and B, and one chip may be implemented with a plurality of pixels including R, G and B.

In an embodiment, the display (e.g., first display 305, second display 310) may include a display area composed of pixels for displaying a virtual image, and light-receiving pixels (e.g., photo sensor pixels) that are arranged between the pixels and receive light reflected from eyes and convert it into electrical energy and output it.

In an embodiment, the electronic device 201 (e.g., processor 260 in FIG. 2) may detect the user's gaze direction (e.g., pupil movement) through light-receiving pixels. For example, the electronic device 201 may detect and track a gaze direction for the user's right eye and a gaze direction for the user's left eye through one or more light-receiving pixels constituting the first display 305 and one or more light-receiving pixels constituting the second display 310. The electronic device 201 may determine the location of the center of a virtual image according to gaze directions of the user's right and left eyes detected through one or more light-receiving pixels (e.g., directions in which pupils of the user's right and left eyes gaze).

In an embodiment, light emitted from the display (e.g., first display 305, second display 310) may pass through a lens (not shown) and a waveguide and reach the screen display section 315 formed on the first transparent member 325a disposed to face the user's right eye and the screen display section 315 formed on the second transparent member 325b disposed to face the user's left eye. For example, light emitted from the display (e.g., first display 305, second display 310) may pass through the waveguide and be reflected on the grating area formed on the input optical member 320 and the screen display section 315 and be delivered to the user's eyes. The first transparent member 325a and/or the second transparent member 325b may be made of a glass plate, a plastic plate, or a polymer, and can be made transparent or translucent.

In an embodiment, a lens (not shown) may be disposed in front of the display (e.g., first display 305, second display 310). The lens (not shown) may include a concave lens and/or a convex lens. For example, the lens (not shown) may include a projection lens or a collimation lens.

In an embodiment, the screen display section 315 or the transparent member (e.g., first transparent member 325a, second transparent member 325b) may include a lens including a waveguide, or a reflective lens.

In an embodiment, the waveguide may be made of glass, plastic, or polymer, and may include a nano pattern, for example, a polygonal or curved grating structure, formed on an inner or outer surface. According to an embodiment, light incident to one end of the waveguide may be propagated inside the display waveguide by the nano pattern and delivered to the user. In an embodiment, a waveguide composed of a freeform prism may provide incident light to the user through a reflection mirror. The waveguide may include at least one of at least one diffractive element (e.g., diffractive optical element (DOE), holographic optical element (HOE)) or a reflective element (e.g., reflective mirror). In an embodiment, the waveguide may guide light emitted from the display (e.g., first display 305 or second display 310) to the user's eyes by using at least one diffractive element or a reflective element included in the waveguide.

According to various embodiments, the diffractive element may include an input optical member 320 and an output optical member (not shown). For example, the input optical member 320 may mean an input grating area, and the output optical member (not shown) may mean an output grating area. The input grating area may serve as an input end for diffracting (or reflecting) light output from the display (e.g., first display 305, second display 310) (e.g., micro LEDs) to transfer the light to the transparent member (e.g., first transparent member 325a, second transparent member 325b) of the screen display section 315. The output grating area may serve as an outlet for diffracting (or reflecting) light delivered to the transparent member (e.g., first transparent member 325a, second transparent member 325b) of the waveguide to the user's eyes.

According to various embodiments, the reflective element may include a total reflection optical element or a total reflection waveguide for total internal reflection (TIR). For example, total internal reflection, as one way of inducing light, may mean making an incident angle such that light (e.g., virtual image) input through the input grating area is reflected 100 percent on one surface (e.g., specific surface) of the waveguide and is delivered 100 percent to the output grating area.

In an embodiment, the path of light emitted from the display (e.g., first display 305 or second display 310) may be guided to the waveguide through the input optical member 320. Light moving inside the waveguide may be guided toward the user's eye through the output optical member. The screen display section 315 may be determined based on light emitted in a direction of the eye.

In an embodiment, the first camera 345 may be referred to as high resolution (HR) or photo video (PV), and may include a high resolution camera. The first camera 345 may include a color camera equipped with functions for obtaining high-quality images such as auto focus (AF) and optical image stabilization (OIS). Without being limited thereto, the first camera 345 may include a global shutter (GS) camera or a rolling shutter (RS) camera.

In an embodiment, the second camera 365a and the third camera 365b may include a camera used for 3 degrees of freedom (3DoF) or 6 degrees of freedom (6DoF) head tracking, hand detection and tracking, and gesture and/or space recognition. For example, the second camera 365a and the third camera 365b may include a global shutter (GS) camera to detect and track the movement of the head and hand.

In an embodiment, at least one sensor (e.g., sensor circuit 230 in FIG. 2) (e.g., gyro sensor, accelerometer sensor, geomagnetic sensor, and/or gesture sensor), the second camera 365a, and the third camera 365b may perform at least one of 6DoF head tracking, pose estimation and prediction, gesture and/or space recognition, or simultaneous localization and mapping (SLAM) through depth shooting.

In another embodiment, the second camera 365a and the third camera 365b may be used separately as a camera for head tracking and a camera for hand tracking.

In an embodiment, the lighting units 330a and 330b may have different uses depending on where they are attached.

For example, the lighting unit 330a or 330b may be attached together with the second camera 365a or the third camera 365b mounted around the hinge (e.g., first hinge 340a, second hinge 340b) connecting the frame and the temple or around the bridge connecting the frames. In the case of shooting with a GS camera, the lighting units 330a and 330b may be used to supplement ambient brightness. For example, the lighting units 330a and 330b may be used when it is not easy to detect a subject to be photographed in a dark environment or due to mixed and reflected light from various light sources.

In an embodiment, components constituting the electronic device 201 (e.g., processor 260 and memory 220 in FIG. 2) may be located on the PCB (e.g., first PCB 335a, second PCB 335b). The PCB may deliver electrical signals to the components constituting the electronic device 201.

In an embodiment, the plurality of microphones (e.g., first microphone 350a, second microphone 350b, third microphone 350c) may process external sound signals into electrical voice data. The processed voice data may be utilized in various ways according to the function being performed (or, application being executed) on the electronic device 201.

In an embodiment, the plurality of speakers (e.g., first speaker 355a, second speaker 355b) may output audio data received through the communication circuit (e.g., communication circuit 210 in FIG. 2) or stored in the memory (e.g., memory 220 in FIG. 2).

In an embodiment, one or more batteries (e.g., battery 360) may be included, and may supply power to the components constituting the electronic device 201.

Figure 4A:
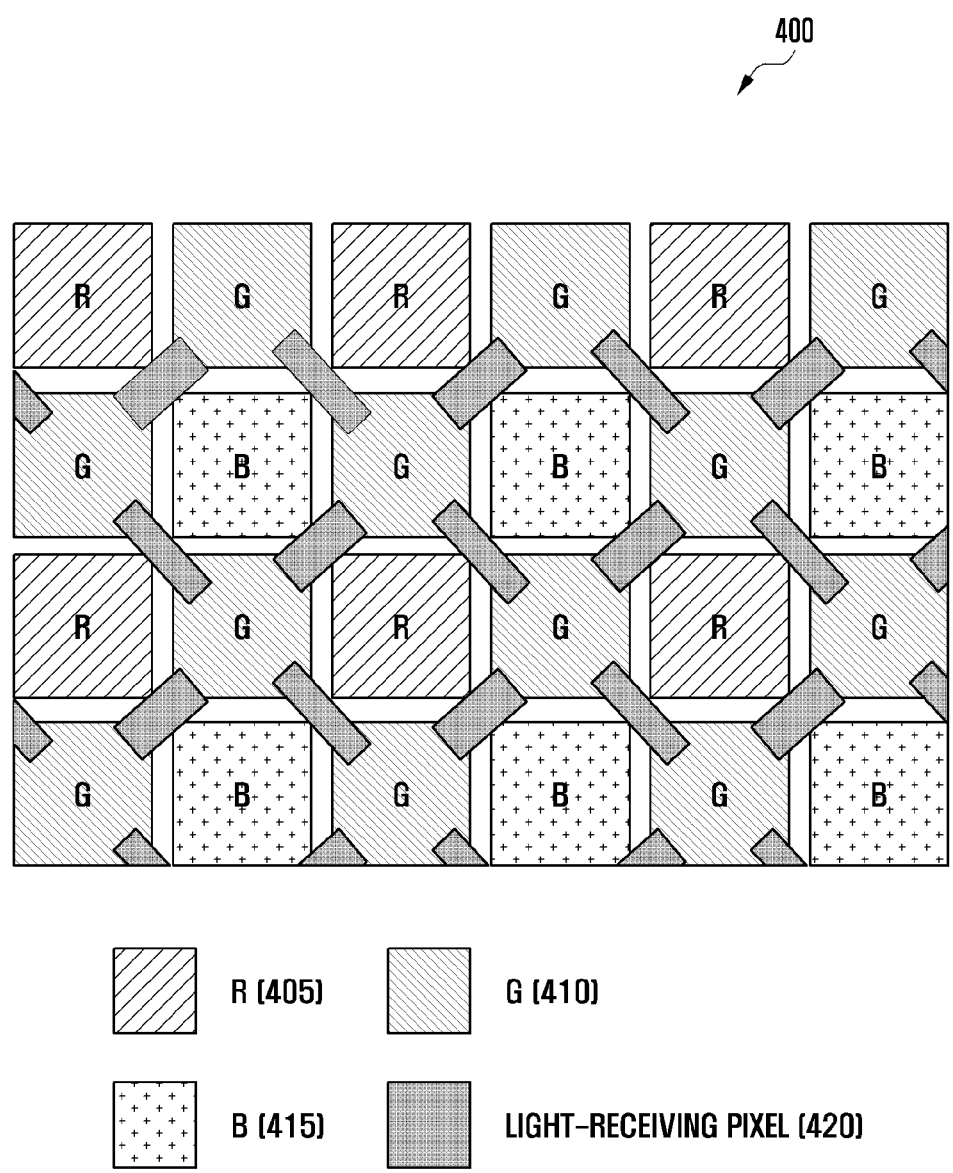
FIG. 4A is a diagram illustrating a plan view of pixels constituting the display according to an embodiment of the disclosure.

FIG. 4A is a diagram illustrating a plan view of pixels constituting a display according to an embodiment of the disclosure.

Referring to FIG. 4A, diagram 400 illustrates a display (e.g., first display 305 or second display 310 in FIG. 3) of the electronic device (e.g., electronic device 201 in FIG. 2) may be composed of a plurality of pixels 405, 410 and 415 and a plurality of light-receiving pixels 420.

In an embodiment, the plurality of pixels may include a red (R) pixel 405, a green (G) pixel 410, and a blue (B) pixel 415. The electronic device 201 may display a virtual image by using the plurality of pixels 405, 410 and 415.

In an embodiment, a light-receiving pixel 420 may be disposed between (or on a periphery (e.g., border) of) the plurality of pixels 405, 410 and 415. The light-receiving pixel 420 disposed between (or on a periphery (e.g., border) of) the plurality of pixels 405, 410 and 415 may receive light reflected from the user's eye. The electronic device 201 may detect the user's gaze direction (e.g., pupil movement) based on reflected light received by light-receiving pixels 420. For example, light emitted from the first display 305 may be reflected by the user's right eye and received by light-receiving pixels 420 constituting the first display 305. Light emitted from the second display 310 may be reflected by the user's left eye and received by light-receiving pixels 420 constituting the second display 310. The electronic device 201 may detect and track a gaze direction for the user's right eye and a gaze direction for the user's left eye based on light received by light-receiving pixels 420 constituting the first display 305 and the second display 310. The electronic device 201 may determine the location of the center of a virtual image based on the detected gaze directions of the user's right and left eyes.

Figure 4B:
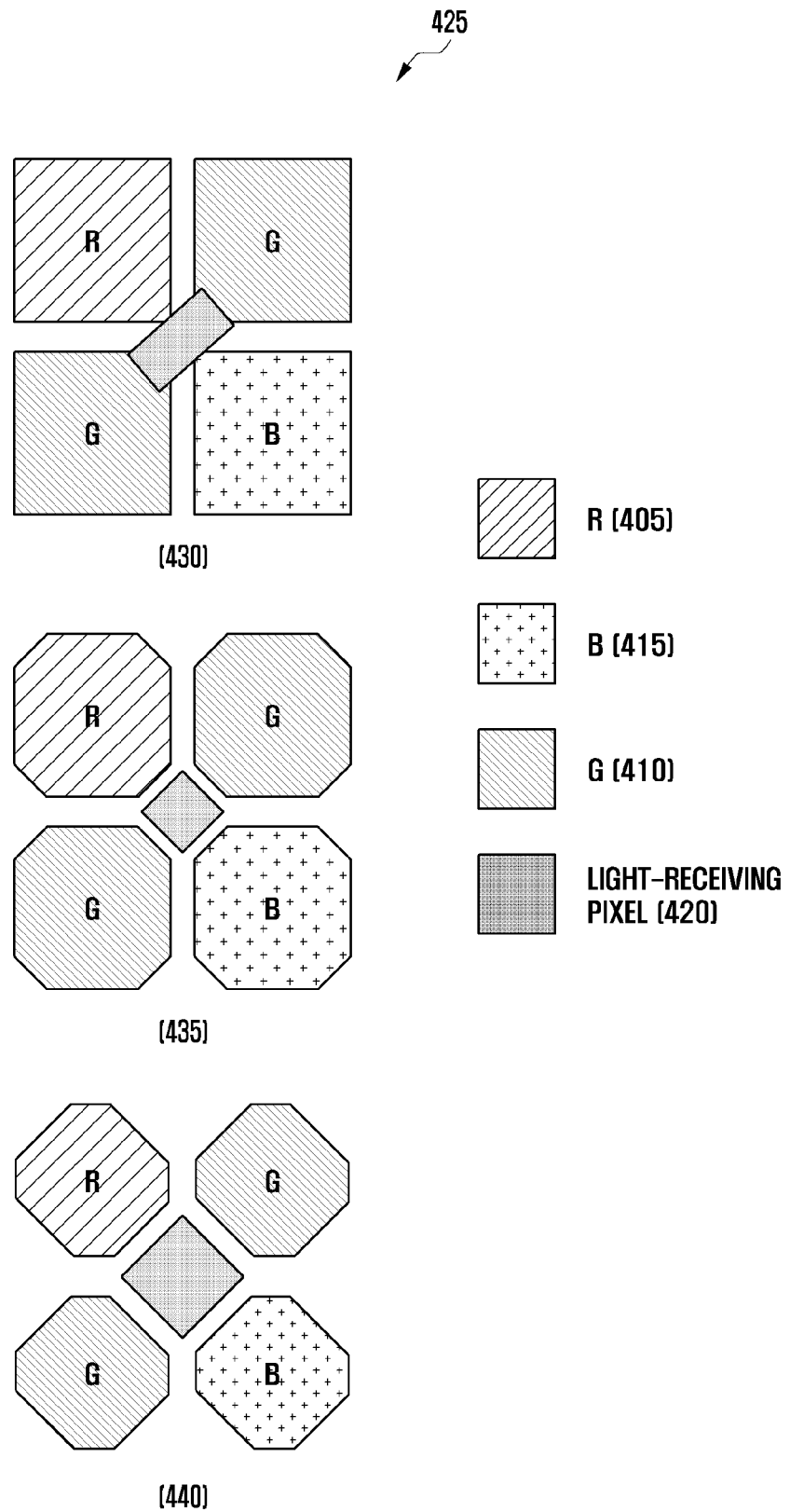
FIG. 4B is a diagram illustrating an arrangement structure of pixels constituting the display according to an embodiment of the disclosure.

FIG. 4B is a diagram illustrating an arrangement structure of pixels constituting a display according to an embodiment of the disclosure.

Referring to FIG. 4B, diagram 425 illustrates a plurality of pixels 405, 410 and 415 and the light-receiving pixel 420 being arranged in various forms. For example, the plurality of pixels 405, 410 and 415 and the light-receiving pixel 420 may be arranged in a pentile structure.

In an embodiment, when the plurality of pixels 405, 410 and 415 and the light-receiving pixel 420 constituting the display (e.g., first display 305 or second display 310) are arranged in a pentile structure, as indicated by indicia <430>, one red (R) pixel 405, two green (G) pixels 410, and one blue (B) pixel 415, whose shape is square, may be arranged, and a rectangular light-receiving pixel 420 may be disposed between the red (R) pixel 405, the two green (G) pixels 410, and the blue (B) pixel 415. The rectangular light-receiving pixels 420 may have different sizes or shapes.

The arrangement structure of the plurality of pixels 405, 410 and 415 and the light-receiving pixel 420 according to various embodiments is not limited to a pentile structure. For example, the plurality of pixels 405, 410 and 415 and the light-receiving pixel 420 may be arranged in various structures such as an RGB structure or a stripe structure.

According to various embodiments, to obtain accurate information about the user's gaze by increasing light reception efficiency in a dark environment where light is insufficient, among the plurality of pixels 405, 410 and 415 and the light-receiving pixel 420, the area of the light-receiving pixel 420 may be widened (e.g., the area occupied by the light-receiving pixel 420 may be increased).

For example, as indicated by indicia <435>, one red (R) pixel 405, two green (G) pixels 410, and one blue (B) pixel 415, whose shape is octahedral, may be disposed, and a rhombic light-receiving pixel 420 may be disposed between the red (R) pixel 405, the two green (G) pixels 410, and the blue (B) pixel 415.

As another example, as indicated by indicia <440>, one red (R) pixel 405, two green (G) pixels 410, and one blue (B) pixel 415, whose shape is rhombic, may be disposed, and a rhombic light-receiving pixel 420 may be disposed between the red (R) pixel 405, the two green (G) pixels 410, and the blue (B) pixel 415.

According to various embodiments, the area occupied by the light-receiving pixel 420 indicated by indicia <440> may be larger than that of the light-receiving pixel 420 indicated by indicia <435>. As the area occupied by the light-receiving pixel 420 indicated by indicia <440> is larger than the area occupied by the light-receiving pixel 420 indicated by indicia <435>, the light-receiving efficiency of the light-receiving pixel 420 indicated by indicia <440> may be higher than that of the light-receiving pixel 420 indicated by indicia <435>.

It has been described in FIG. 4B according to various embodiments that the area occupied by the light-receiving pixel 420 is increased to heighten the light receiving efficiency, without being limited thereto.

In an embodiment, the electronic device 201 may check whether the charge amount of one or more light-receiving pixels receiving light reflected from each of the user's left and right eyes is less than or equal to a specified charge amount. If the charge amount of one or more light-receiving pixels receiving light reflected from each of the user's left and right eyes is less than or equal to the specified charge amount, the electronic device 201 may receive light reflected from each of the user's left and right eyes by using one or more light-receiving pixels and one or more light-receiving pixels arranged close to the one or more light-receiving pixels. Light reflected from the user's right and left eyes may be converted into electrical signals by one or more light-receiving pixels and one or more light-receiving pixels arranged close to the one or more light-receiving pixels. The converted electrical signals may be transmitted to a processor, for example, an image signal processor (ISP) (not shown). The image signal processor may perform image processing in a manner suitable for tracking the user's right and left eyes, and may, based on this, identify the location of the user's pupils and track the direction in which the pupils move, for example, the gaze direction.

According to various embodiments, if the charge amount of one or more light-receiving pixels receiving light reflected from each of the user's left and right eyes is less than or equal to the specified charge amount, the electronic device 201 may receive light reflected from each of the user's right and left eyes by using one or more light-receiving pixels and one or more light-receiving pixels arranged close to the one or more light-receiving pixels. Accordingly, the light receiving efficiency may be increased. In other words, the electronic device 201 may utilize one or more light-receiving pixels and one or more light-receiving pixels arranged close to the one or more light-receiving pixels to receive light reflected from each of the user's right and left eyes, and thus the user's gaze information can be accurately obtained.

According to various embodiments, the plurality of pixels 405, 410 and 415 and the light-receiving pixel 420 may be arranged in a configuration in which at least two of the structures indicated above by indicia <430>, <435>, and <440> are merged.

Figure 4C:
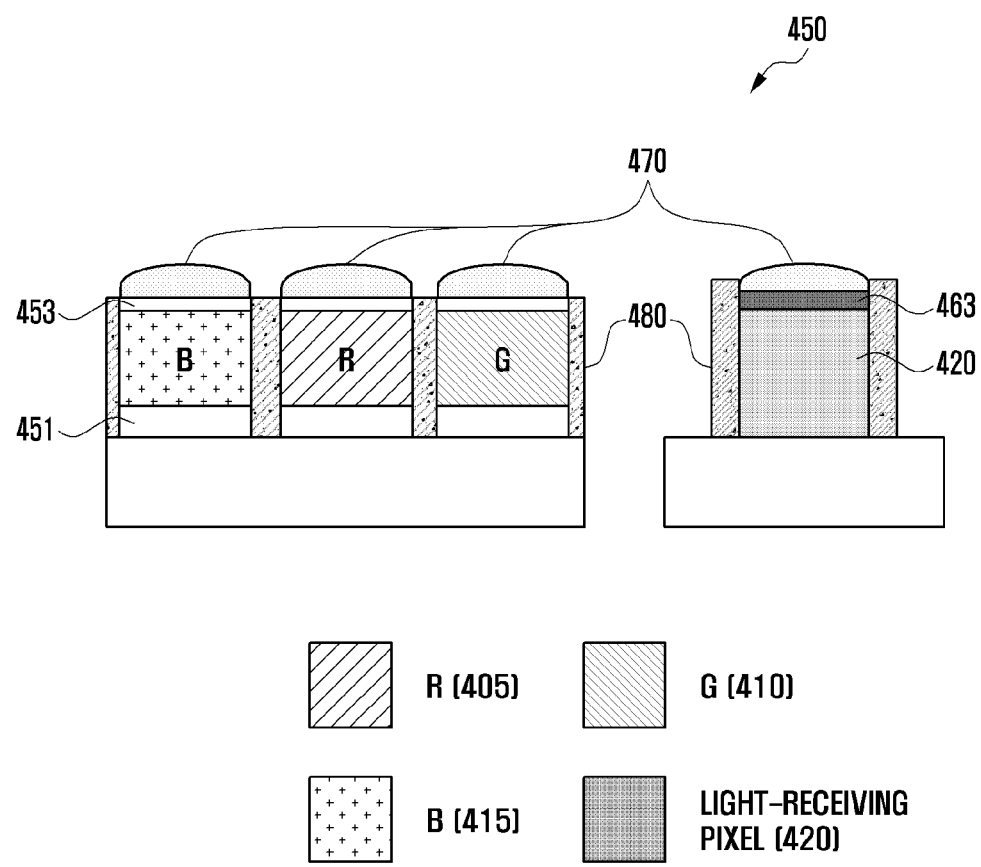
FIG. 4C is a diagram illustrating a cross-sectional view of a plurality of pixels constituting the display according to an embodiment of the disclosure.

FIG. 4C is a view illustrating a cross-sectional view of a plurality of pixels constituting a display according to an embodiment of the disclosure.

Referring to FIG. 4C, view 450 illustrates a display (e.g., first display 305, second display 310 in FIG. 3) being composed of at least one micro light emitting diode (micro LED). The display may include a blue (B) pixel 415, a red (R) pixel 405, a green (G) pixel 410, and a light-receiving pixel 420.

In an embodiment, each of the blue (B) pixel 415, red (R) pixel 405, and green (G) pixel 410 may include a color filter 453 and an LED 451 for causing the pixel to emit light. The color filter 453 may include a blue filter, a red filter, and a green filter. Without being limited thereto, the color filter 453 may include a yellow filter, a magenta filter, or a cyan filter.

In various embodiments, each of the blue (B) pixel 415, the red (R) pixel 405, and the green (G) pixel 410 has been described as including the color filter 453, but it is not limited thereto. For example, each of the blue (B) pixel 415, the red (R) pixel 405, and the green (G) pixel 410 may include a no color filter (not shown) and the LED 451 for causing the pixel to emit light.

In an embodiment, the light-receiving pixel 420 may include a no color filter 463.

In an embodiment, to guide light in a specific direction, each of the blue (B) pixel 415, the red (R) pixel 405, the green (G) pixel 410, and the light-receiving pixel 420 may include a micro lens 470. For example, the micro lens 470 may be formed on the color filter 453 in correspondence to each of the blue (B) pixel 415, the red (R) pixel 405, the green (G) pixel 410, and the light-receiving pixel 420.

In an embodiment, to prevent the light passing through the micro lens 470 from being reflected or mixed with neighboring pixels due to unintended causes, each of the blue (B) pixel 415, the red (R) pixel 405, the green (G) pixel 410, and the light-receiving pixel 420 may be separated by a partition wall 480. As each pixel (e.g., blue (B) pixel 415, red (R) pixel 405, green (G) pixel 410, and light-receiving pixel 420) is separated by the partition wall 480, visibility can be improved by preventing the emitted light from being mixed.

In various embodiments, the shape of the partition wall is not limited to the shape shown in FIG. 4C. For example, the partition wall may be formed in various shapes according to the shape and size of each pixel.

Figure 5A:
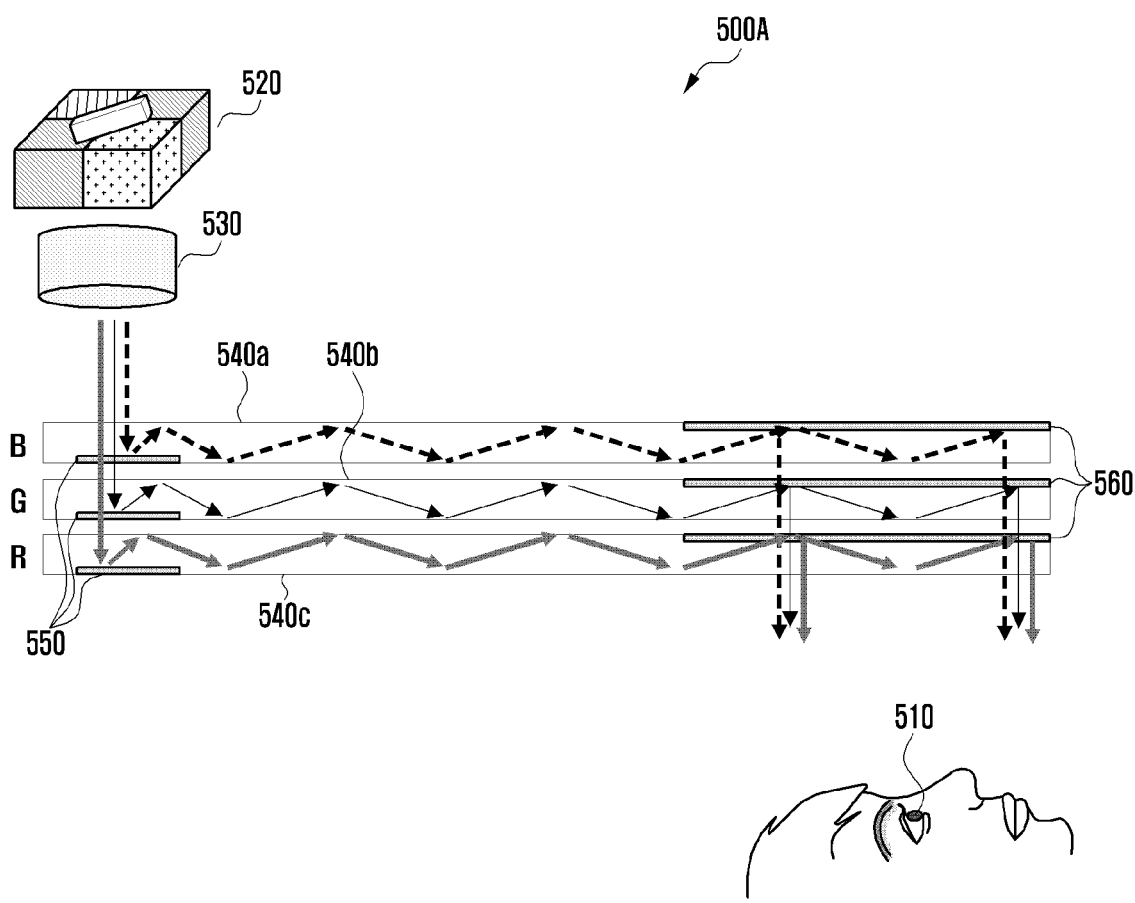
FIGS. 5A and 5B are diagrams for depicting a path of visible light output from the display and a path of visible light reflected from a user's eye according to various embodiments of the disclosure.
Figure 5B:
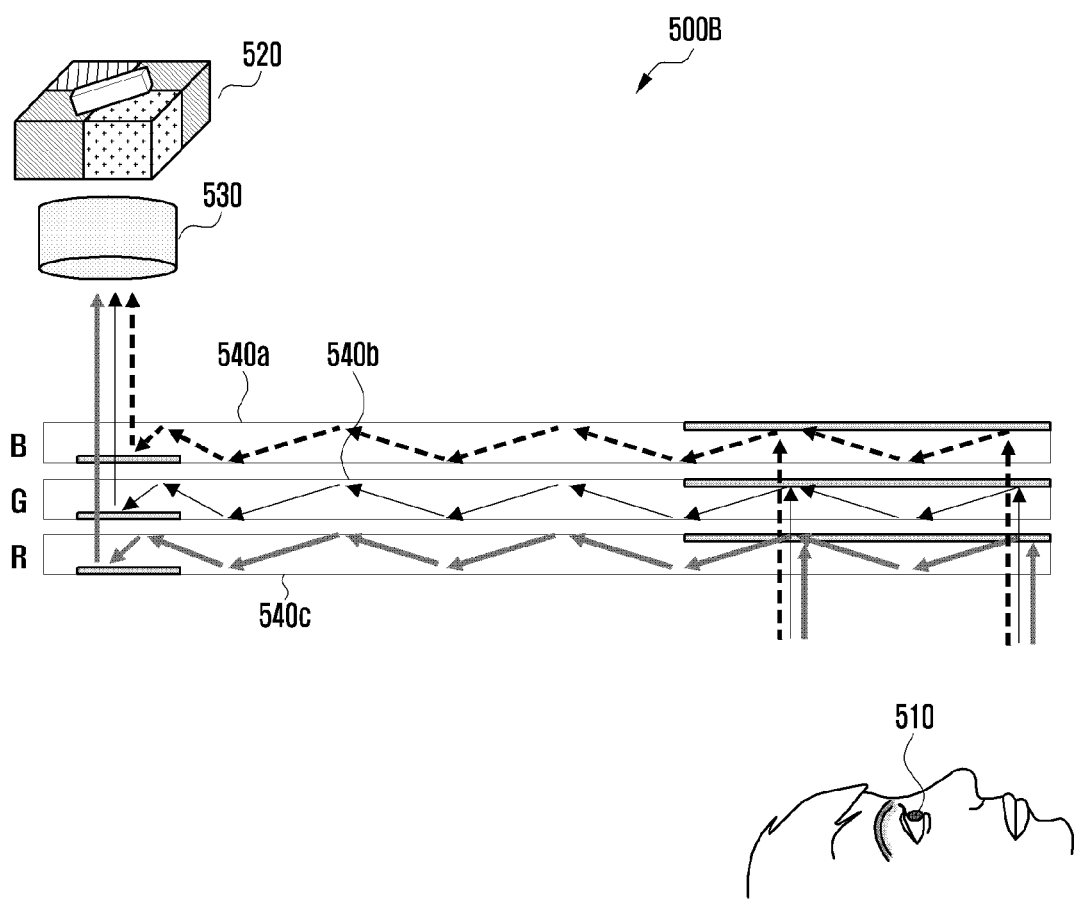

FIGS. 5A and 5B are diagrams for depicting a path of visible light output from a display and a path of visible light reflected from a user's eye according to various embodiments of the disclosure.

Referring to FIG. 5A, according to an embodiment, diagram 500A illustrates a situation in which light emitted from a display 520 (e.g., first display 305, second display 310 in FIG. 3) is assumed to be visible light (e.g., RGB visible light). The display 520 (e.g., first display 305, second display 310) may be composed of a plurality of pixels (e.g., red pixel 405, green pixel 410, blue pixel 415 in FIG. 4A) and a light-receiving pixel (e.g., light-receiving pixel 420 in FIG. 4A) disposed between the plurality of pixels 405, 410 and 415.

In an embodiment, a lens 530 may be disposed in front of the display 520. Visible light emitted from the display 520 (e.g., first display 305, second display 310) may pass through the lens 530 (e.g., projection lens or collimation lens). The lens 530 may include a concave lens and/or a convex lens.

In an embodiment, among the RGB visible light emitted from the display 520, blue (B) visible light passing through the lens 530 may reach a user's eye 510 through a first layer 540a of the waveguide. For example, blue (B) visible light emitted from the display 520 may be reflected by an input grating 550 of the first layer 540a of the waveguide, and the reflected blue (B) visible light may be totally reflected to reach an output grating 560 and be reflected by the output grating 560 to reach the user's eye 510. Among the RGB visible light emitted from the display 520, green (G) visible light passing through the lens 530 may reach the user's eye 510 through a second layer 540b of the waveguide. For example, green (G) visible light emitted from the display 520 may be reflected by the input grating 550 of the second layer 540b of the waveguide, and the reflected green (G) visible light may be totally reflected to reach the output grating 560 and be reflected by the output grating 560 to reach the user's eye 510. Among the RGB visible light emitted from the display 520, red (R) visible light passing through the lens 530 may reach the user's eye 510 through a third layer 540c of the waveguide. For example, red (R) visible light emitted from the display 520 may be reflected by the input grating 550 of the third layer 540c of the waveguide, and the reflected red (R) visible light may be totally reflected to reach the output grating 560 and be reflected by the output grating 560 to reach the user's eye 510.

Referring to FIG. 5B, according to an embodiment, diagram 500B illustrates visible light (e.g., RGB visible light) reaching the user's eye 510 through individual layers (e.g., first layer 540a, second layer 540b, third layer 540c) of the waveguide being reflected from the user's eye 510. The light-receiving pixel 420 may receive the reflected visible light through individual layers (e.g., first layer 540a, second layer 540b, third layer 540c) of the waveguide and the lens 530.

According to various embodiments, when the light output from the display 520 (e.g., first display 305, second display 310) is visible light, the path through which the visible light reaches the user's eye 510 and the path through which the visible light reflected from the user's eye 510 is received may be the same. For example, blue (B) visible light reaching the user's eye 510 through the first layer 540a of the waveguide may be reflected from the user's eye 510 and received by the light-receiving pixel 420 through the first layer 540a. Green (G) visible light reaching the user's eye 510 through the second layer 540b of the waveguide may be reflected from the user's eye 510 and received by the light-receiving pixel 420 through the second layer 540b. Red (R) visible light reaching the user's eye 510 through the third layer 540c of the waveguide may be reflected from the user's eye 510 and received by the light-receiving pixel 420 through the third layer 540c.

In FIGS. 5A and 5B according to various embodiments, the waveguide is shown as being composed of three layers, for example, first layer 540a, second layer 540b, and third layer 540c, but it is not limited thereto. For example, the waveguide may be composed of two layers or one layer.

Figure 6:
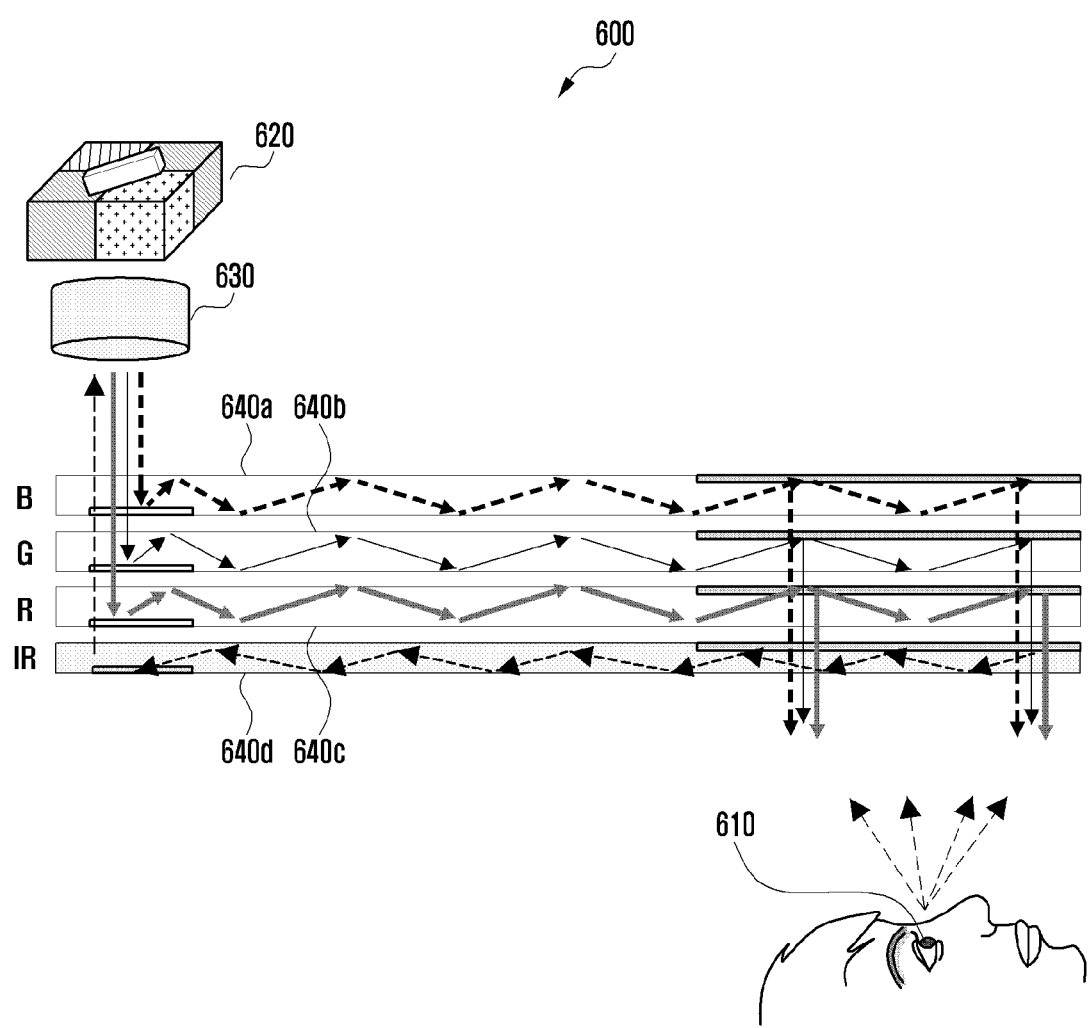
FIG. 6 is a diagram for depicting paths of visible light and infrared light output from the display according to an embodiment of the disclosure.

FIG. 6 is a diagram for depicting paths of visible light and infrared light output from a display according to an embodiment of the disclosure.

Referring to FIG. 6, according to an embodiment, diagram 600 illustrates visible light (e.g., RGB visible light) being emitted from a display 620 (e.g., first display 305, second display 310 in FIG. 3). One or more infrared LEDs (not shown) for emitting infrared rays may be disposed in the frame of the electronic device (e.g., electronic device 201 in FIG. 2).

In an embodiment, RGB visible light may be emitted from the display 620 (e.g., the first display 305 and the second display 310), and infrared light may be emitted from the one or more infrared LEDs.

In an embodiment, the display 620 (e.g., first display 305, second display 310) may be composed of a plurality of pixels (e.g., red pixel 405, green pixel 410, blue pixel 415 in FIG. 4A) and a light-receiving pixel (e.g., light-receiving pixel 420 in FIG. 4A) disposed between the plurality of pixels 405, 410 and 415.

In an embodiment, a lens 630 may be disposed in front of the display 620. Visible light emitted from the display 620 (e.g., first display 305, second display 310) may pass through the lens 630 (e.g., projection lens or collimation lens).

In an embodiment, among the RGB visible light emitted from the display 620, blue (B) visible light passing through the lens 630 may reach a user's eye 610 through a first layer 640a of the waveguide. Among the RGB visible light emitted from the display 620, green (G) visible light passing through the lens 630 may reach the user's eye 610 through a second layer 640b of the waveguide. Among the RGB visible light emitted from the display 620, red (R) visible light passing through the lens 630 may reach the user's eye 610 through a third layer 640c of the waveguide.

In an embodiment, infrared light may be emitted from one or more infrared LEDs disposed in the frame of the electronic device 201, and the emitted infrared light may be delivered to the user's eye 610. The light-receiving pixel 420 may receive reflected infrared light through a fourth layer 640d (e.g., infrared (IR) layer) of the waveguide and the lens 630.

In FIG. 6, according to various embodiments, when visible light is output from the display 620 (e.g., first display 305 or second display 310) and infrared light is output from the at least one infrared LED, the path through which visible light reaches the user's eye 510 and the path through which infrared light reflected from the user's eye 610 is received may be different. For example, whereas RGB visible light may reach the user's eye 610 through several layers (e.g., first layer 640a, second layer 640b, third layer 640c) of the waveguide, infrared light reflected from the user's eye 610 may be received by the light-receiving pixel 420 through the fourth layer 640d.

Without being limited thereto, in various embodiments, during a period (time) in which visible light is not output from the display 620 (e.g., first display 305, second display 310), infrared light may be received by the light-receiving pixel 420 through the first to third layers (e.g., layers 640a, 640b, 640c) as well as the fourth layer 640d of the waveguide.

In FIG. 6, according to various embodiments, the waveguide is shown as being composed of four layers, for example, first layer 640a, second layer 640b, third layer 640c, and fourth layer 640d, but it is not limited thereto. For example, the waveguide may be composed of two layers or one layer.

Figure 7:
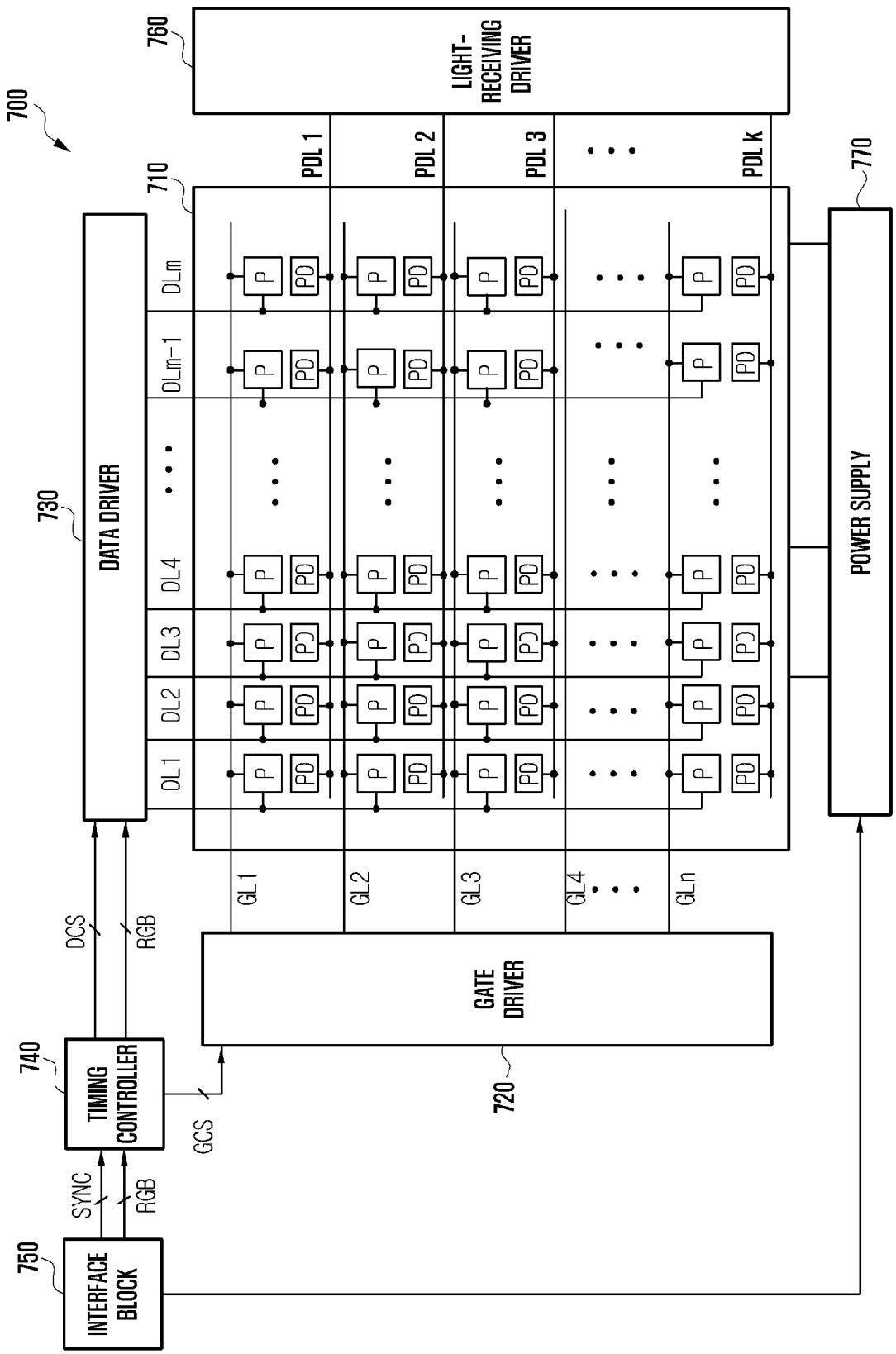
FIG. 7 is a block diagram illustrating a display according to an embodiment of the disclosure.

FIG. 7 is a block diagram illustrating a display according to an embodiment of the disclosure.

Referring to FIG. 7, block diagram 700 illustrates a display (e.g., first display 305, second display 310 in FIG. 3) may include a display panel 710 and a display driver IC (DDI) for display control. The DDI may include a gate driver 720, a data driver 730, a timing controller 740, and an interface block 750.

In an embodiment, the display (e.g., first display 305 or second display 310) may include a plurality of gate lines GL1 to GLn, a plurality of data lines DL1 to DLm crossing them. The display panel 710 may include a plurality of pixels (P) formed in regions where the gate lines GL and the data lines DL cross one another.

In an embodiment, the display (e.g., first display 305 or second display 310) may further include a plurality of light-receiving pixel lines PDL1 to PDLk. A light-receiving pixel PD (e.g., light-receiving pixel 420 in FIG. 4A) may be disposed between a plurality of sub-pixels (e.g., red (R) pixel 405, green (G) pixel 410, blue (B) pixel 415 in FIG. 4A). The light-receiving pixel lines PDL may be connected to the light-receiving pixels PD (e.g., light-receiving pixel 420). The light-receiving pixel PD may include a light-receiving photodiode.

In an embodiment, each pixel P may include a plurality of sub-pixels (e.g., red (R) pixel 405, green (G) pixel 410, blue (B) pixel 415). Each sub-pixel may be formed to include a light emitting diode (e.g., micrometer-sized light emitting diode (micro LED)) to emit light of the corresponding color, and a driving circuit (not shown) for driving the light emitting diode. The driving circuit may be configured to include at least one thin film transistor and at least one capacitor, and it may be electrically connected to one of the gate lines GL and may be electrically connected to one of the data lines DL. The driving circuit may charge the capacitor with a data voltage supplied through the connected data line DL from the data driver 222 in response to a scan signal received through the connected gate line GL from the gate driver 221. The driving circuit may control the amount of current supplied to the LED according to the data voltage charged in the capacitor. That is, individual sub-pixels may display visual information based at least on the scan signal and the data signal.

Although not shown, the display (e.g., first display 305 or second display 310) may be configured to further include, in addition to the signal lines, various signal lines (e.g., Sens lines, L-TEST lines, TEST lines) for driving the pixels P, and a plurality of power lines (e.g., VDD lines, VSS lines, Vcas lines) for supplying power to the pixels (P).

In an embodiment, the gate driver 720 may supply scan signals to the plurality of gate lines GL1 to GLn according to at least one gate control signal GCS provided from the timing controller 740. The gate driver 720 may include a gate shift register to output a scan signal or scan pulse. The scan signal is sequentially supplied to individual pixels P, and may be composed of a single signal or multiple signals. When the scan signal is composed of multiple signals, each gate line GL may be composed of a plurality of lines to supply multiple scan signals to each pixel P.

In an embodiment, the data driver 730 may convert image data RGB provided from the timing controller 740 into a data voltage according to at least one data control signal DCS provided from the timing controller 740. The data driver 730 may generate a data voltage by using multiple gamma correction voltages. The data driver 730 may sequentially supply the generated data voltage to a plurality of pixels P line by line, for example, in a row-wise manner. The data driver 730 may include a data shift register that outputs a sampling signal, a latch circuit that latches image data row by row in response to a sampling signal, and a digital analog converter that converts latched image data into an analog grayscale voltage (pixel voltage).

In an embodiment, a light-receiving driver 760 may deliver power, control signals, and information to the light-receiving pixels (PD) (e.g., light-receiving pixel 420) through a plurality of light-receiving pixel lines PDL1 to PDLk. Each light receiving pixel (PD) may receive light reflected from the user's eye under the control of the light-receiving driver 760.

In an embodiment, when the brightness of light reflected from each of the user's eyes, for example, the left and right eyes, is less than or equal to a specified brightness value, the light-receiving driver 760 may deliver power, control signals, and information to one or more corresponding light-receiving pixels through the light-receiving pixel lines PDL1 to PDLk so as to receive light reflected from each of the user's left and right eyes by using one or more light-receiving pixels disposed close to the one or more light-receiving pixels PD.

In an embodiment, the timing controller 740 may align video data RGB provided from the interface block 750 according to the size and resolution of the display. The timing controller 740 may supply aligned video data RGB to the data driver 730. The timing controller 740 may transmit a plurality of control signals GCS and DCS by using at least one synchronization signal SYNC provided from the interface block 750. The plurality of control signals GCS and DCS may include at least one gate control signal GCS and at least one data control signal DCS. The gate control signal GCS may be a signal for controlling the driving timing of the gate driver 720. The data control signal DCS may be a signal for controlling the driving timing of the data driver 730. The synchronization signals SYNC may include a dot clock (DCLK), a data enable signal (DE), a horizontal synchronization signal (Hsync), or a vertical synchronization signal (Vsync).

In an embodiment, the interface block 750 may receive video data RGB from the processor (e.g., processor 120 in FIG. 1), for example, an application processor, and transmit the received video data RGB to the timing controller 740. The interface block 750 may generate at least one synchronization signal SYNC and transmit it to the timing controller 740. The interface block 750 may control a power supply 770 to supply at least one driving voltage to the display.

In an embodiment, the power supply 770 may generate at least one driving voltage necessary for driving the display and supply the generated driving voltage to the display. The at least one driving voltage may include, for example, VDD, VS S (GND), gate-on voltage, gate-off voltage, or initialization voltage. The gate-on voltage may be a voltage for turning on at least one thin film transistor included in the display. The gate-off voltage may be a voltage for turning off at least one thin film transistor included in the display. The initialization voltage may be a voltage for initializing a specific node in the driving circuit for driving at least one sub-pixel among a plurality of sub-pixels.

Figure 8:
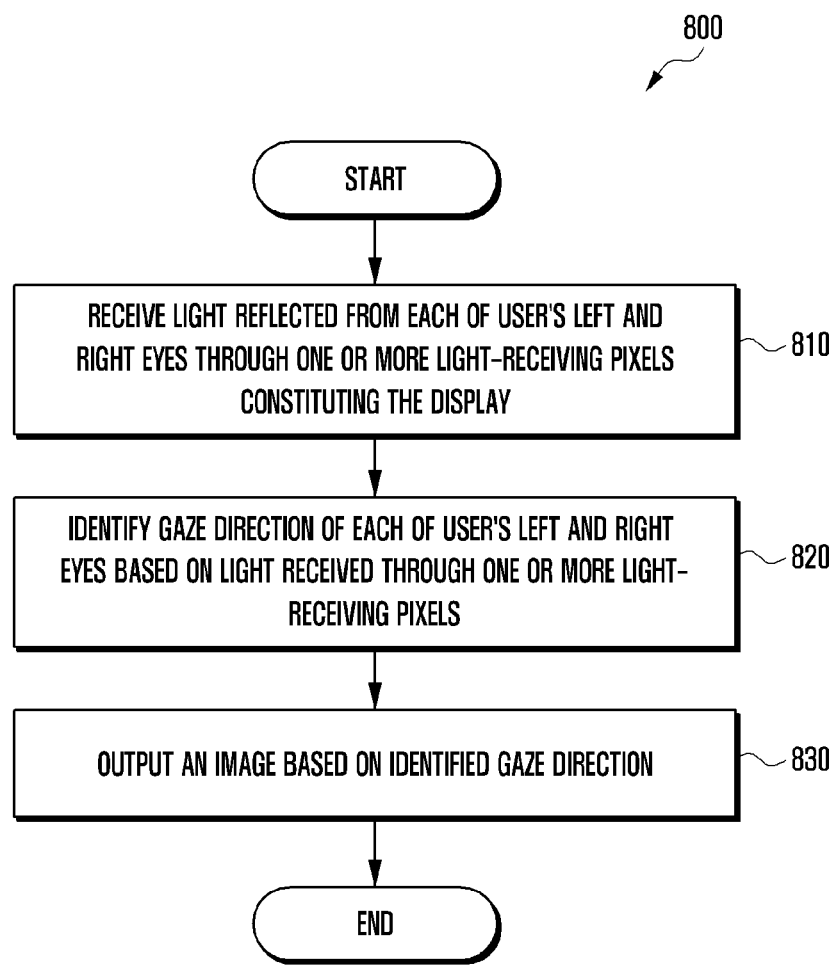
FIG. 8 is a flowchart illustrating a method of detecting a user's gaze direction and outputting an image based on the detected gaze direction according to an embodiment of the disclosure.

FIG. 8 is a flowchart illustrating a method of detecting a user's gaze direction and outputting an image based on the detected gaze direction according to an embodiment of the disclosure.

It may be understood that operations 810, 820, and 830 of FIG. 8 according to various embodiments are performed by the processor 260 of the electronic device (e.g., electronic device 201 in FIG. 2).

Referring to FIG. 8, flowchart 800 illustrates, at operation 810, the electronic device 201 receiving light reflected from each of the user's left eye and right eye through one or more light-receiving pixels (e.g., light-receiving pixel 420 in FIG. 4A) constituting the display (e.g., first display 305, second display 310 in FIG. 3).

In an embodiment, the display (e.g., first display 305 or second display 310) may be composed of at least one micro light emitting diode (micro LED). The display may include the first display 305 and the second display 310. Each of the first display 305 and the second display 310 may include a plurality of pixels (e.g., red pixel 405, green pixel 410, blue pixel 415 in FIG. 4A) for displaying a virtual image, and a light-receiving pixel 420 disposed between the plurality of pixels to receive light reflected from the eye.

In an embodiment, light emitted from the first display 305 and the second display 310 may pass through a lens (e.g., lens 530 in FIGS. 5A and 5B, lens 630 in FIG. 6) (e.g., projection lens or collimation lens). Light passing through the lens 530 may reach the user's eyes (e.g., user's left and right eyes) through a waveguide (e.g., waveguide (e.g., layers 540*a*, 540*b*, and 540*c*) in FIGS. 5A and 5B, waveguide (e.g., layers 640*a*, 640*b*, 640*c*, and 640*d*) in FIG. 6). Light reaching the user's eyes (e.g., user's left and right eyes) may be reflected from the user's eyes (e.g., user's left and right eyes). The light-receiving pixel 420 may receive light reflected from the user's eyes (e.g., user's left and right eyes). For example, light emitted from the first display 305 may be reflected from the user's right eye and received by one or more light-receiving pixels constituting the first display 305. Light emitted from the second display 310 may be reflected from the user's left eye and received by one or more light-receiving pixels constituting the second display 310.

In an embodiment, at operation 820, the electronic device 201 may identify the gaze directions of the user's left and right eyes based on the light received through one or more light-receiving pixels.

In an embodiment, the electronic device 201 may detect the user's gaze direction (e.g., pupil movement) based on light reflected from the user's eyes (e.g., user's left and right eyes). For example, the electronic device 201 may detect and track the gaze direction of the user's right eye and the gaze direction of the user's left eye based on light received by one or more light-receiving pixels provided in the first display 305 and the second display 310. Light reflected from the user's right and left eyes may be converted into electrical signals at one or more light-receiving pixels provided in the first display 305 and the second display 310. The converted electrical signals may be transmitted to a processor, for example, an image signal processor (ISP) (not shown). The image signal processor may perform image processing in a manner suitable for tracking the user's right and left eyes, and may, based on this, identify the location of the user's pupils and track the direction in which the pupils move, for example, the gaze direction.

In an embodiment, at operation 830, the electronic device 201 may output an image based on the identified gaze direction.

In an embodiment, the electronic device 201 may determine the location of the screen display section (e.g., screen display section 315 in FIG. 3) to output a virtual image based on the direction in which the tracked user's eyes move. For example, the position of the screen display section 315 on the first transparent member (e.g., first transparent member 325a in FIG. 3) disposed to face the user's right eye and the second transparent member (e.g., second transparent member 325b in FIG. 3) disposed to face the user's left eye may be determined. In other words, the electronic device 201 may determine the location of the center of a virtual image according to gaze directions of the user's right and left eyes (e.g., directions in which the pupils of the user's right and left eyes gaze).

In an embodiment, the electronic device 201 may output an image to the screen display section 315.

Figure 9:
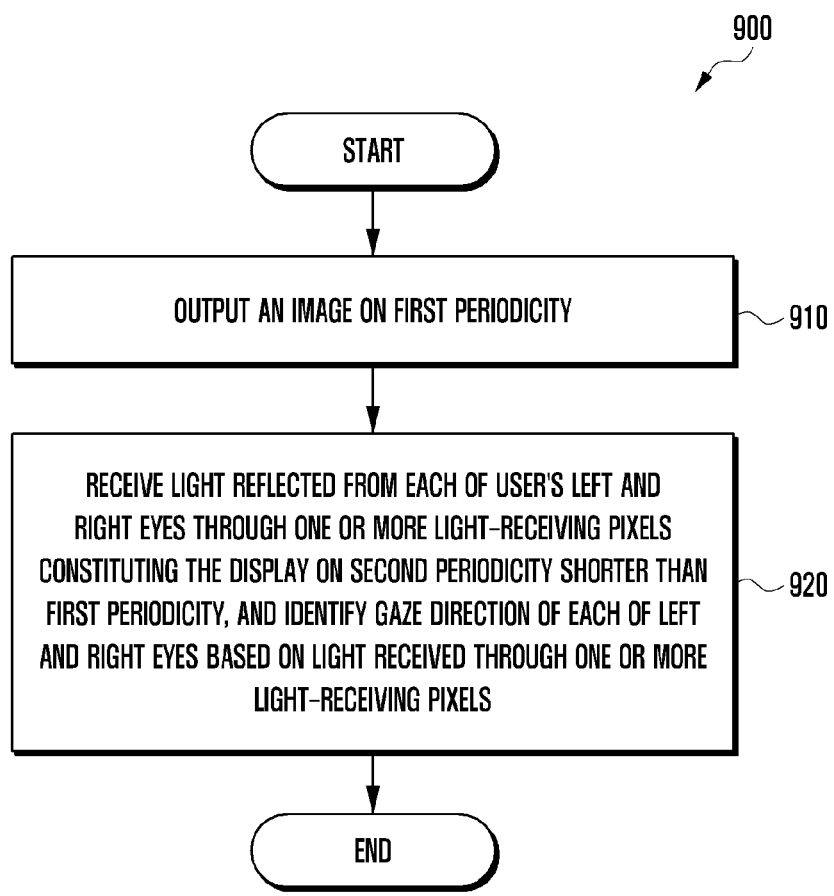
FIG. 9 is a flowchart illustrating a method for the electronic device to output an image by adjusting the periodicity of outputting a video signal and the periodicity of receiving reflected light according to an embodiment of the disclosure.

FIG. 9 is a flowchart illustrating a method for an electronic device to output an image by adjusting the periodicity of outputting a video signal and the periodicity of receiving reflected light according to an embodiment of the disclosure.

It may be understood that operations 910 and 920 of FIG. 9 according to various embodiments are performed by the processor 260 of the electronic device (e.g., electronic device 201 in FIG. 2).

Referring to FIG. 9, flowchart 900 illustrates, at operation 910, the electronic device 201 outputting an image on a first periodicity. For example, the electronic device 201 may control the display (e.g., first display 305, second display 310 in FIG. 3) to output a virtual image on a specific periodicity (e.g., 120 Hz, 240 Hz).

In an embodiment, the electronic device 201 may set the timing for driving pixels (e.g., red pixel 405, green pixel 410, blue pixel 415 in FIG. 4A) to output a virtual image and the timing for driving light-receiving pixels (e.g., light-receiving pixel 420 in FIG. 4A) to receive light reflected from the user's eyes (e.g., user's right and left eyes).

In an embodiment, at operation 920, the electronic device 201 may receive light reflected from each of the user's left and right eyes through one or more light-receiving pixels constituting the display (e.g., first display 305 or second display 310) on a second periodicity shorter than the first periodicity, and identify the gaze directions of the left and right eyes based on the received light.

Although the second periodicity has been described as being shorter than the first periodicity according to various embodiments, it is not limited thereto. For example, the second periodicity may be longer than, or equal to the first periodicity.

Various embodiments will be described with reference to FIG. 10 below in relation to adjusting the periodicity of outputting a video signal and the periodicity of receiving the reflected light.

A method of obtaining user gaze information by using light-receiving pixels 420 of the display (e.g., first display 305 or second display 310) of the electronic device 201 according to various embodiments may include: receiving light reflected from each of the user's left and right eyes through one or more light-receiving pixels 420 constituting the display (e.g., first display 305 or second display 310); identifying the gaze direction of each of the left and right eyes based on the light received through the one or more light-receiving pixels 420; and outputting an image based on the identified gaze direction.

According to various embodiments, receiving the light reflected from each of the user's left and right eyes through the one or more light-receiving pixels 420 may include receiving light having been output from the display (e.g., first display 305 or second display 310) and reflected from each of the user's left and right eyes through the one or more light-receiving pixels 420, wherein the path through which the light is output and the path through which the light is received via the one or more light-receiving pixels 420 may be the same.

The method of obtaining user gaze information by using light-receiving pixels 420 of the display (e.g., first display 305 or second display 310) of the electronic device 201 according to various embodiments may further include adjusting the timing for driving the plurality of pixels and the timing for driving the one or more light-receiving pixels 420.

According to various embodiments, outputting the image may include outputting an image by driving the plurality of pixels 405, 410 and 415 on a first periodicity; the method of obtaining user gaze information by using light-receiving pixels 420 of the display (e.g., first display 305 or second display 310) of the electronic device 201 may further include receiving the light reflected from each of the user's left and right eyes by driving the one or more light-receiving pixels 420 on a second periodicity equal to, or longer than the first periodicity.

According to various embodiments, outputting the image may include outputting an image by driving the plurality of pixels 405, 410 and 415 on a first periodicity; the method of obtaining user gaze information by using light-receiving pixels 420 of the display (e.g., first display 305, second display 310) of the electronic device 201 may further include receiving the light reflected from each of the user's left and right eyes by driving the one or more light-receiving pixels 420 on a second periodicity shorter than the first periodicity.

According to various embodiments, receiving the light reflected from each of the user's left and right eyes through one or more light-receiving pixels 420 may include receiving infrared light having been output from at least one light source and reflected from each of the user's left and right eyes through the one or more light-receiving pixels 420, wherein the path through which the infrared light is output and the path through which the infrared light is received via the one or more light-receiving pixels 420 may be different.

According to various embodiments, each of the plurality of pixels 405, 410 and 415 and the one or more light-receiving pixels 420 may include a micro lens.

According to various embodiments, the plurality of pixels 405, 410 and 415 and the one or more light-receiving pixels 420 may be arranged to be separated from each other by partition walls.

According to various embodiments, the display (e.g., first display 305 or second display 310) may include signal transmission paths for controlling the plurality of pixels 405, 410 and 415, and signal transmission paths for controlling the one or more light-receiving pixels 420.

The method of obtaining user gaze information by using light-receiving pixels 420 of the display (e.g., first display 305, second display 310) of the electronic device 201 may further include: determining, after receiving light reflected from each of the user's left and right eyes through one or more light-receiving pixels 420 constituting the display (e.g., first display 305 or second display 310), whether the charge amount of the one or more light-receiving pixels 420 is less than or equal to a specified charge amount; and receiving, upon determining that the charge amount of the one or more light-receiving pixels 420 is less than the specified charge amount, light reflected from each of the user's left and right eyes by using the one or more light-receiving pixels 420 and one or more light-receiving pixels 420 arranged close to the one or more light-receiving pixels 420.

Figure 10:
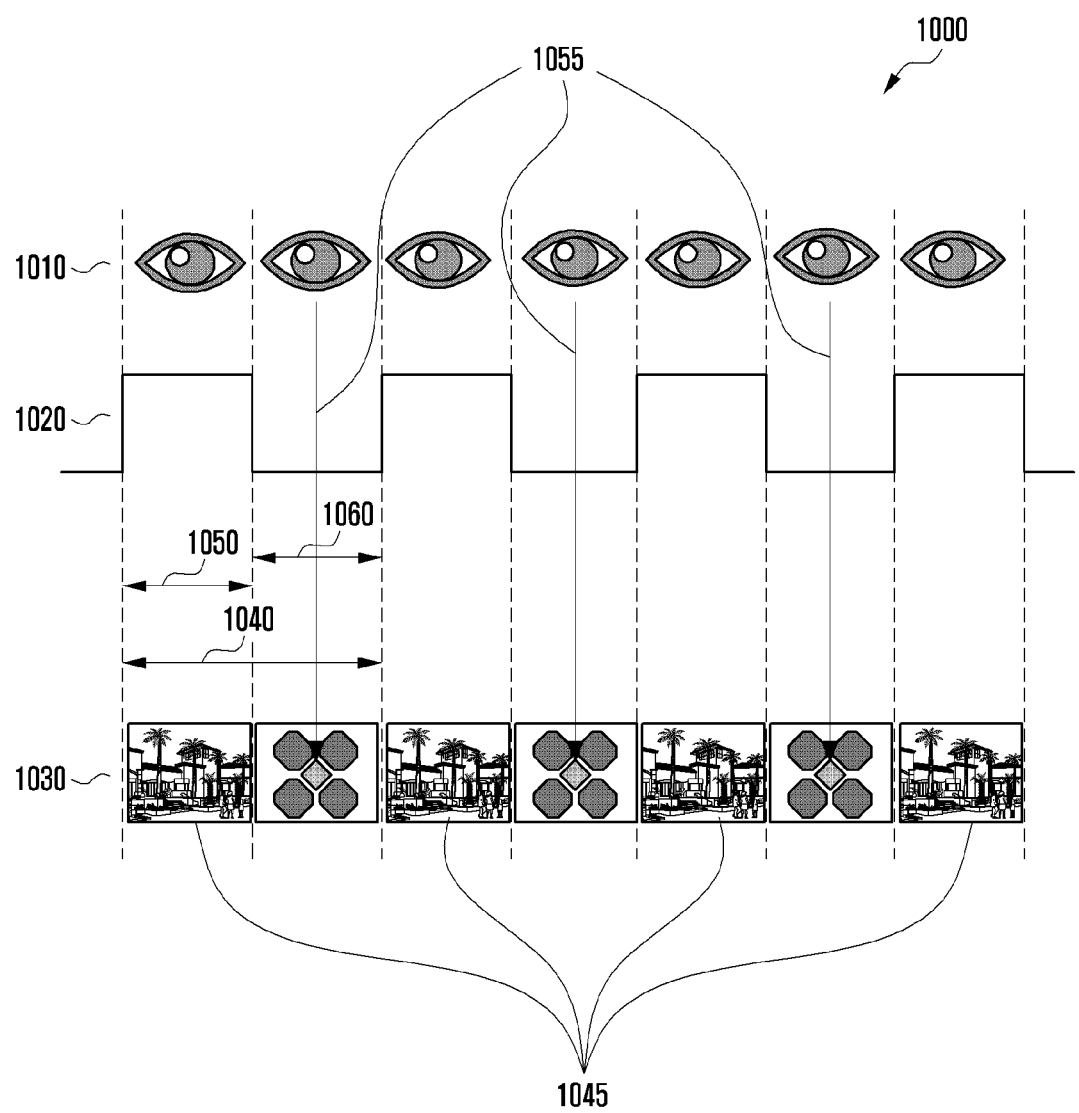
FIG. 10 is a diagram for depicting the periodicity of outputting a video signal and the periodicity of receiving reflected light in the electronic device according to embodiment of the disclosure.

FIG. 10 is a diagram for depicting the periodicity of outputting a video signal and the periodicity of receiving reflected light in an electronic device according to an embodiment of the disclosure.

According to various embodiments, a display 1030 (e.g., first display 305, second display 310 in FIG. 3) of the electronic device (e.g., electronic device 201 in FIG. 2) may be composed of pixels (e.g., red (R) pixel 405, green (G) pixel 410, blue (B) pixel 415 in FIG. 4A) for outputting a virtual image, and light-receiving pixels (e.g., light-receiving pixel 420 in FIG. 4A) that are arranged between the pixels and receive light reflected from a user's eye 1010 (e.g., user's right eye and/or left eye), convert the received light into electric energy, and output it.

Referring to FIG. 10, diagram 1000 illustrates the display 1030 being driven at a specific frequency 1020 (e.g., about 120 Hz or about 240 Hz) to output a virtual image.

In an embodiment, the electronic device 201 may set a timing for driving the plurality of pixels 405, 410 and 415 to output a virtual image and a timing for driving the light-receiving pixels 420 to receive light reflected from the user's eye 1010 (e.g., user's right eye and/or left eye).

In an embodiment, the operation of driving the plurality of pixels 405, 410 and 415 to output a virtual image and the operation of driving the light-receiving pixels 420 to receive light reflected from the user's eye 1010 may be switched at a specific frame rate (e.g., about 0.5 frames per second (fps) or about 0.25 fps). For example, the electronic device 201 may output a virtual image (1045) by driving the pixels (e.g., red (R) pixel 405, green (G) pixel 410, blue (B) pixel 415) for outputting a virtual image during a half frame period 1050 of one frame period 1040, and may detect an output optical signal having been reflected from the user's eye 1010 (e.g., user's right and left eyes) (1055) by driving the light-receiving pixels 420 during the remaining half frame period 1060.

According to various embodiments, as described above, the timing for driving the plurality of pixels 405, 410 and 415 to output a virtual image and the timing for driving the light-receiving pixels 420 to receive light reflected from the user's eye 1010 (e.g., user's right and left eyes) may be set differently, thereby reducing interference between pixels.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it denotes that the element may be coupled with the other element directly (e.g., through wires), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply denotes that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a plurality of pixels;
light-receiving pixels arranged between neighboring pixels among the plurality of pixels;
a display including the plurality of pixels and the light-receiving pixels; and
a processor operatively connected to the display,
wherein the processor is configured to:
receive light reflected from each of a user's left and right eyes through one or more light-receiving pixels constituting the display,
based on the light received through the one or more light-receiving pixels, identify a gaze direction of each of the user's left and right eyes, and based on the gaze direction, output an image,
wherein the light comprises visible light,
wherein the processor is further configured to:
adjust a timing of driving the plurality of pixels and a timing of driving the one or more light-receiving pixels, and
receive visible light having been output from the display and reflected from each of the user's left and right eyes through the one or more light-receiving pixels,
wherein the timing is set for a specific frame rate and during a first portion of a frame period the plurality of pixels are driven to output visible light and during a second portion of the frame period the one or more light-receiving pixels are driven to receive light, and
wherein a path through which the visible light is output and a path through which the visible light is received through the one or more light-receiving pixels are the same, the path including a waveguide and a grating.

2. The electronic device of claim 1, wherein the processor is further configured to:
control the outputting of the image by driving the plurality of pixels on the first portion of the frame period, and
receive the light reflected from each of the user's left and right eyes by driving the one or more light-receiving pixels on the second portion of the frame period equal to or longer than the first portion of the frame period.

3. The electronic device of claim 1, wherein the processor is further configured to:
control the outputting of the image by driving the plurality of pixels on the first portion of the frame period, and
receive the light reflected from each of the user's left and right eyes by driving the one or more light-receiving pixels on the second portion of the frame period shorter than the first portion of the frame period.

4. The electronic device of claim 1, further comprising:
at least one light source configured to output infrared light,
wherein the processor is further configured to:
receive the infrared light output through the at least one light source and reflected from each of user's left and right eyes through the one or more light-receiving pixels, and
wherein a path through which the infrared light is output and a path through which the infrared light is received through the one or more light-receiving pixels are different.

5. The electronic device of claim 1, wherein each of the plurality of pixels and the one or more light-receiving pixels includes a micro lens.

6. The electronic device of claim 5, wherein the plurality of pixels and the one or more light-receiving pixels are separated by partition walls.

7. The electronic device of claim 1, wherein the display includes signal transmission paths for controlling the plurality of pixels and signal transmission paths for controlling the one or more light-receiving pixels.

8. The electronic device of claim 1, wherein the processor is further configured to:
based on a charge amount of the one or more light-receiving pixels having received light reflected from each of the user's left and right eyes being less than or equal to a specified charge amount, receive the light reflected from each of the user's left and right eyes by using the one or more light-receiving pixels and another one or more light-receiving pixels arranged close to the one or more light-receiving pixels.

9. A method for obtaining user's gaze information by using light-receiving pixels of a display of an electronic device, the method comprising:
receiving light reflected from each of a user's left and right eyes through one or more light-receiving pixels constituting the display;
based on the light received through the one or more light-receiving pixels, identifying a gaze direction of each of the user's left and right eyes; and
based on the gaze direction, outputting an image,
wherein the light comprises visible light,
wherein the method further comprises:
adjusting a timing of driving a plurality of pixels included in the display and a timing of driving the one or more light-receiving pixels,
wherein the receiving of the visible light reflected from each of user's left and right eyes through the one or more light-receiving pixels comprises receiving visible light having been output from the display and reflected from each of the user's left and right eyes through the one or more light-receiving pixels,
wherein the timing is set for a specific frame rate and during a first portion of a frame period the plurality of pixels are driven to output visible light and during a second portion of the frame period the one or more light-receiving pixels are driven to receive light, and wherein a path through which the visible light is output and a path through which the visible light is received through the one or more light-receiving pixels are the same, the path including a waveguide and a grating.

10. The method of claim 9, wherein the outputting of the image comprises outputting the image by driving the plurality of pixels on the first portion of the frame period, and wherein the method further comprises:

receiving the light reflected from each of the user's left and right eyes by driving the one or more light-receiving pixels on the second portion of the frame period equal to or longer than the first portion of the frame period.

11. The method of claim 9, wherein the outputting of the image comprises outputting the image by driving the plurality of pixels on the first portion of the frame period, and wherein the method further comprises:

receiving the light reflected from each of the user's left and right eyes by driving the one or more light-receiving pixels on second portion of the frame period shorter than the first portion of the frame period.

12. The method of claim 9, wherein the receiving of the light reflected from each of user's left and right eyes through the one or more light-receiving pixels comprises receiving, through the one or more light-receiving pixels, infrared light having been output from at least one light source and reflected from each of user's left and right eyes, and wherein a path through which the infrared light is output and a path through which the infrared light is received through the one or more light-receiving pixels are different.

13. The method of claim 9, wherein each of a plurality of pixels and the one or more light-receiving pixels includes a micro lens.

14. The method of claim 13, wherein the plurality of pixels and the one or more light-receiving pixels are separated by partition walls.

15. The method of claim 9, wherein the display includes signal transmission paths for controlling a plurality of pixels constituting the display and signal transmission paths for controlling the one or more light-receiving pixels.

16. The method of claim 9, further comprising:

based on a charge amount of the one or more light-receiving pixels having received light reflected from each of the user's left and right eyes being less than or equal to a specified charge amount, receiving the light reflected from each of the user's left and right eyes by using the one or more light-receiving pixels and another one or more light-receiving pixels arranged close to the one or more light-receiving pixels.

* * * * *